United States Patent [19]

Clancy et al.

[11] Patent Number: 5,113,462
[45] Date of Patent: May 12, 1992

[54] HIGH ENERGY FIBER OPTICA COUPLER

[75] Inventors: Michael G. Clancy, Westford; Gary W. Jaegle, Auburn, both of Mass.

[73] Assignee: Candela Laser Corporation, Wayland, Mass.

[21] Appl. No.: 682,872

[22] Filed: Apr. 8, 1991

Related U.S. Application Data

[63] Continuation-in-part of Ser. No. 531,934, Jun. 1, 1990, abandoned.

[51] Int. Cl.$^5$ .............................................. G02B 6/36
[52] U.S. Cl. ...................................... 385/53; 385/56; 385/76
[58] Field of Search ............................ 350/96.2, 96.21; 385/53, 56, 76, 77

[56] References Cited

U.S. PATENT DOCUMENTS

| | | | |
|---|---|---|---|
| 4,145,110 | 3/1979 | Szentesi | 350/96.15 |
| 4,482,201 | 11/1984 | Dousset | 350/96.20 |
| 4,545,644 | 10/1985 | DeVeau, Jr. et al. | 350/96.21 |
| 4,615,581 | 10/1986 | Morimoto | 350/96.21 |
| 4,681,398 | 6/1987 | Bailey et al. | 350/96.20 |
| 4,799,759 | 1/1989 | Balyasny | 350/96.21 |
| 4,818,059 | 4/1989 | Kakii et al. | 350/96.21 |
| 4,818,061 | 4/1989 | Iwano et al. | 350/96.21 |
| 4,842,363 | 6/1989 | Margolin et al. | 350/96.21 |
| 4,898,446 | 2/1990 | Hinckley | 350/96.20 |
| 4,930,859 | 6/1990 | Hoffman | 350/96.21 |

*Primary Examiner*—John D. Lee
*Assistant Examiner*—Stephen W. Barns
*Attorney, Agent, or Firm*—Hamilton, Brook, Smith & Reynolds

[57] ABSTRACT

An optical coupler couples optical fibers carrying high energy signals. The coupler includes an adapter thaat interfaces two optical connectors. The optical connectors are positioned within the adapter to bring two optical fibers into optical communication. The optical connectors fit into the adapter in a manner than imposes a gap of at least 0.001 inch and preferably between 0.003 to 0.005 inch between the optical fibers. Moreover, the optical connectors include bevelled ferrules that provide additional space at the interface between the fibers. The gap and the space between the fiber work in conjunction to minimize damage to the fibers.

14 Claims, 5 Drawing Sheets

FIG. I

HIGH ENERGY FIBER OPTICA COUPLER

This is a continuation-in-part of co-pending application Ser. No. 07/531,934 filed on Jun. 1, 1990 (abandoned).

BACKGROUND OF THE INVENTION

Optical couplers provide a means for realizing an optical connection between optical fibers. A typical optical coupler is comprised of two optical connectors and a main body for interfacing the two optical connectors. Each of the optical connectors holds a separate optical fiber in a fixed and aligned position. The optical connectors fit into respective ends of the main body so as to create the optical connection between the respective optical fibers. The fit of the optical connectors to the main body is such that the optical fibers abut each other end to end.

SUMMARY OF THE INVENTION

A problem frequently encountered by current optical couplers is damage to the fibers at the fiber interface. This problem is especially acute for couplers that interconnect high powered optical fibers (i.e. fibers carrying high energy signals). It is believed that the damage results from the accumulation and obliteration of debris at the connection point between fibers. It is further believed that the problem of debris is exacerbated when portions of the optical signal spill over the connection point (due to misalignment or other causes) and strike the fiber cladding or optical coupler. When the coupler is struck by the optical spillage, the coupler is damaged, resulting in the creation of debris at the connection point. The debris remains at the connection point until obliterated by the optical signal. In many cases, this obliteration results in additional damage to the system.

The present invention overcomes the debris problem in three ways. First, materials are selected that are not readily damaged by the optical signal spillage. Second, a gap is introduced between the fibers in the coupler where debris may pass. Third, bevels are provided on the ends of ferrules that hold the fibers. The bevels that face the interconnection point provide additional space for the debris to travel so that the optical signals can push the debris into the additional space. The bevels also serve to diminish the likelihood of damage to the coupler by removing the portion of the coupler that is most likely to be damaged by the spillage.

In accordance with the present invention, an optical connector aids in optically connecting optical fibers. The connector is comprised of a first optical fiber which carries light signals, especially high power light signals having intensities greater than 20 megawatts per square centimeter. The connector also includes a ferrule for positioning and aligning this optical fiber. One end of the ferrule is bevelled to prevent generation of debris and to provide additional space at an interface between the first optical fiber and a second optical fiber. Preferably, the second optical fiber is, likewise, positioned within a similar optical connector.

It is preferred that the ferrule be comprised of $SiO_2$ such as fused quartz or fused silica (fused sliica is synthetic fused quartz). Such materials are chosen so that the damage threshold of the ferrule is at least as great as that of the optical fiber. The optical fiber may be comprised of, for instance, an outer cladding of doped fused silica (to lower the index of refraction) and an inner core of fused silica material having no dopant. In the preferred embodiment, the optical fiber is cleaved and not polished. The cleaving may be done by any of a number of conventional means, such as scoring the fiber under tension.

The ferrule serves to properly position and align the first optical fiber within the optical connector. So as to simplify the task of appropriately centering the first optical fiber within the ferrule, a receiving end (second end) of the ferrule is also bevelled. The bevel at the second end serves as a conical director that eases insertion of the optical fiber into the ferrule.

Proper positioning of the optical connector relative to the optical coupler is achieved through the assistance of a flange provided on the connector. The flange abuts a shoulder in the adapter to assure proper positioning of the optical connector relative to the adapter. Since the relationship between the optical connector and the optical fiber is fixed, the positioning of the connector also brings about proper spacing between the optical fibers when the connector is positioned in an optical coupler.

The optical coupler includes an adapter in addition to optical connectors. The optical connectors are preferably secured to the adapter by means such as nuts. The optical coupler includes a second optical connector like the first optical connector. The second optical connector faces the first optical connector. The second optical connector, like its counterpart, contains a ferrule with a bevelled end. The bevelled ends of the ferrule face each other but are spaced so as to provide space at the interface of the fibers and to prevent generation of debris. The optical coupler also preferably includes a positioning sleeve for properly positioning the ferrules of the two connectors coaxially inside the adapter. A suitable positioning sleeve is a sleeve comprised of plastic material.

In accordance with one embodiment of the present invention, the first optical fiber and the second optical fiber are separated by a gap of at least 0.001 inch. This gap minimizes the damage suffered by the optical fibers by providing space for the debris to travel. Large gaps, however, suffer from large transmission losses. Generally a gap of about 0.004 inch minimizes damage to the fibers with reasonable manufacturing tolerance, yet with acceptable attenuation of the signal.

DETAILED DESCRIPTION OF THE PREFERRED EMBODIMENT

Prior art optical couplers have suffered damage as well as low coupling transmission efficiency because of inappropriate choice of materials, inappropriate spacing and the failure to employ bevelled ferrules. The preferred embodiment of the present invention overcomes these difficulties by imposing a gap between optical fibers, by choosing ferrule materials that have a damage threshold at least as great as the optical fibers, and lastly, by having bevels on the ferrules to reduce generation of debris and to provide additional space where debris may travel without affecting performance.

Figure 1:
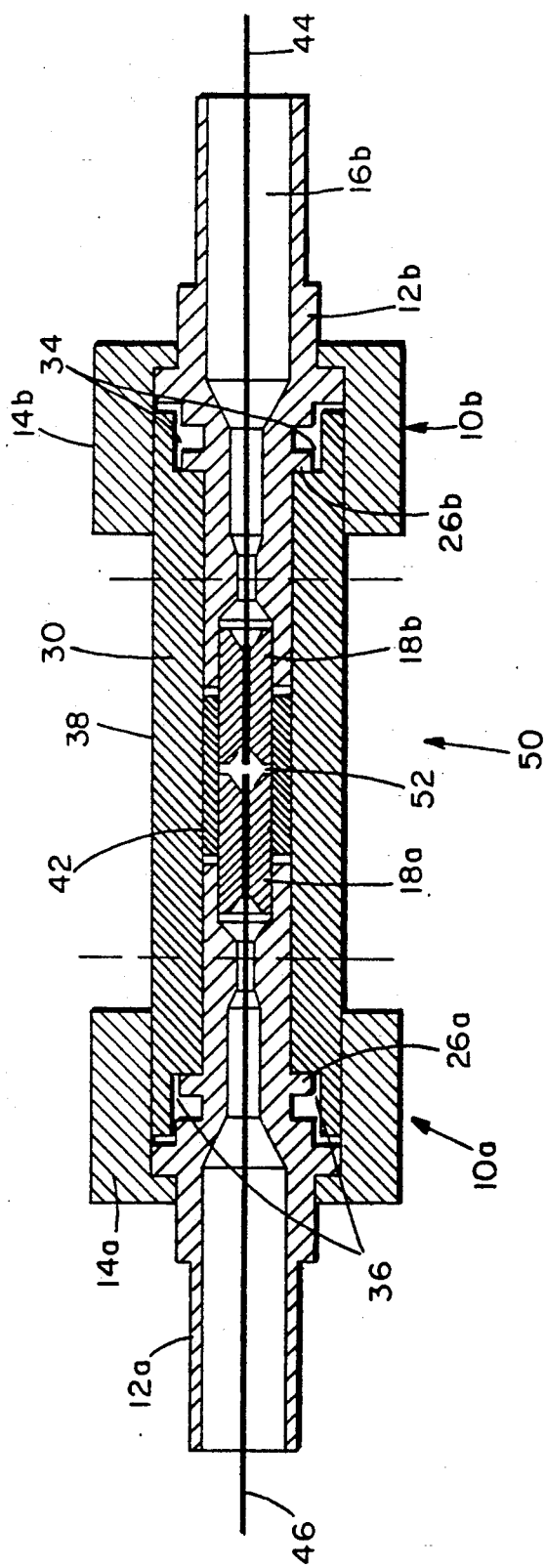
FIG. 1 is a longitudinal sectional illustration of the optical coupler.

FIG. 1 illustrates the optical coupler 50 of the preferred embodiment. The coupler 50 is comprised of an adapter 30 and first and second optical connectors 10a and 10b, respectively. The adapter 30 acts as an interface between the connectors 10a and 10b. In the first optical connector 10a, an optical fiber 46 passes through an inner cavity 16a and a quartz ferrule 18a. The ferrule material is preferably fused quartz or fused silica (synthetic fused quartz). This quartz ferrule 18a is held in position within the adapter 30 by a positioning sleeve 42. Analogously, the second optical connector 10b carries an optical fiber 44 through cavity 16b to a second quartz ferrule 18b. This optical fiber 44, like its counterpart 46, is positioned within the ferrule 18b that is, likewise, held by the positioning sleeve 42. The optical fibers 44 and 46 may be multi-mode fibers. Moreover, the fibers 44 and 46 may carry high power signals having intensities in excess of 20 megawatts per square centimeter. Because of these high energies, it is preferred that the ends of the fibers which are coupled within the coupler 50 are cleaved and not polished. Such a cleave may be obtained, for example, by scoring the fiber under tension.

Figure 2:
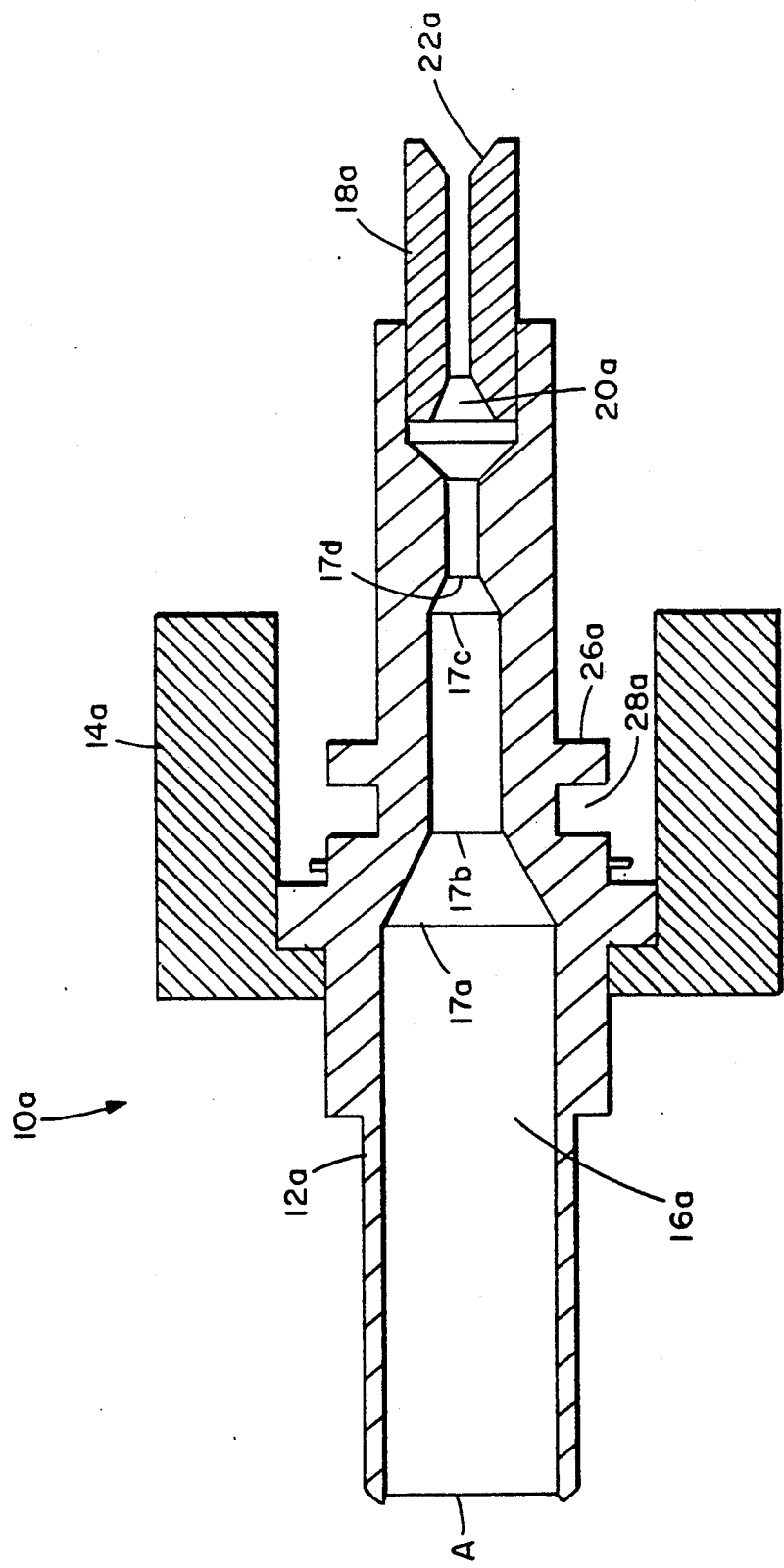
FIG. 2 is a longitudinal sectional view of the optical connector employed in the optical coupler of FIG. 1.

The optical connector 10a is shown in more detail in FIG. 2. The other optical connector 10b has a similar configuration. The connector 10a is largely like the SMA 906 standard connector such as that sold by the American Phenolic Corporation. The standard SMA 906, however, has a stainless steel or ceramic ferrule and has no bevel facing the interconnection point between fibers. Moveover, the ferrule for the standard SMA 906 is epoxied in the connector at a position that will insure that the ferrule abuts a ferrule of another connector when both connectors are properly connected to the adapter.

The connector 10a is comprised of a main body 12a of stainless steel. The main body 12a is machined to have an inner cavity 16a of decreasing diameter. The diameter of this inner cavity 16a is decreased in stepwise fashion at tapers 17a, 17b, 17c and 17d to ease the burden of machining the main body 12. The decreasing diameter of the inner cavity 16 serves to ease insertion of an optical fiber (not shown) into the connector 10a and to guide the connector 10a from the end "A" of the connector 10a to the quartz ferrule 18. The optical connector 10a is precision machined to insure proper radial position of the connector 10a inside the adapter. A nut 14a is secured to the main body 12a to allow the connector 14a to be secured to an adapter 30.

The quartz ferrule 18a has bevels 20a and 22a on opposite ends. Bevel 20a serves much the same role as the inner cavity 16a serves. In particular, the bevel 20a assists in guiding the optical fiber into the ferrule 18a. The bevel 22a on the opposite end of the ferrule 18a, however, serves to provide additional space at the interface between optical fibers 44 and 46 and to prevent generation of debris. This bevel 22a is fire polished. Further details regarding the role of bevel 22a are given below.

Figure 3A:
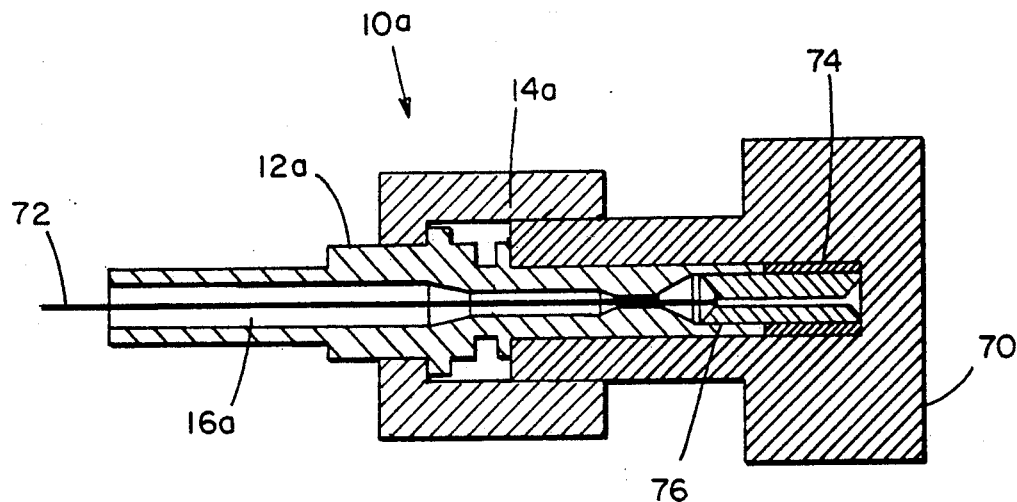
FIG. 3a and 3b illustrate steps taken to properly position the ferrule and optical fiber within the optical connector.
Figure 3B:
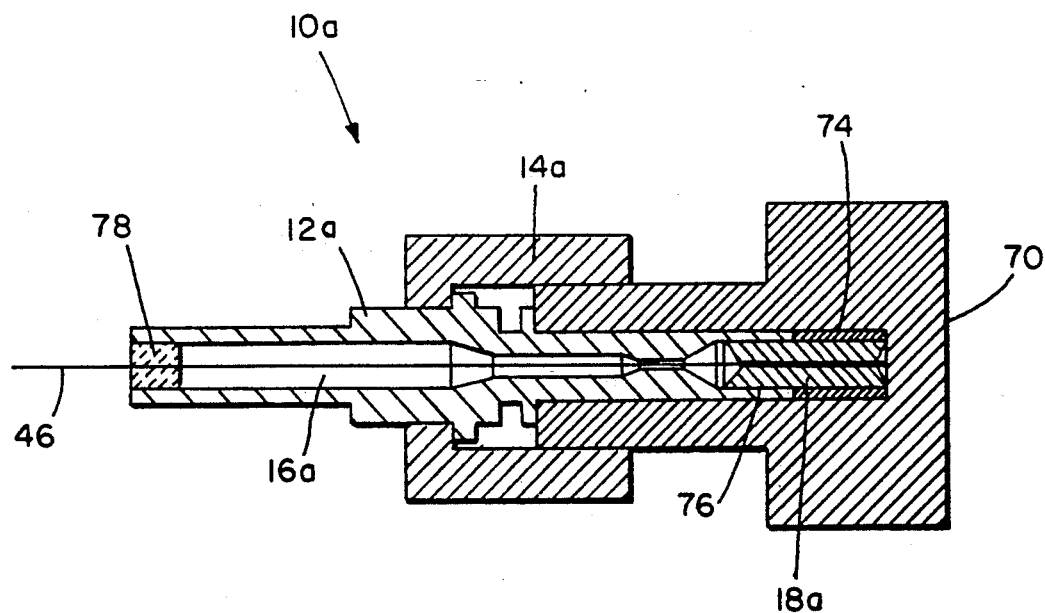

The ferrule 18a is epoxied inside the main body 12a. The ferrule must be precisely positioned within the main body 12 to obtain proper fiber position in the optical coupler. Proper ferrule position is realized by using a positioning cap 70 as shown in FIG. 3a. The cap has external thread and is drawn by the nut 14a against the flange 26a. Before the epoxy at 76 sets, the ferrule 18a is positioned by a positioning pin 72 so that it abuts the positioning cap 70. The positioning cap 70 includes a sleeve 74 for aiding in the positioning of the ferrule 18a. Similarly as shown in FIG. 3b, the fiber 46 is positioned so that it abuts the positioning cap 70. Epoxy 78 is then applied at the end of the connector 10a to secure the fiber in position.

Figure 4:
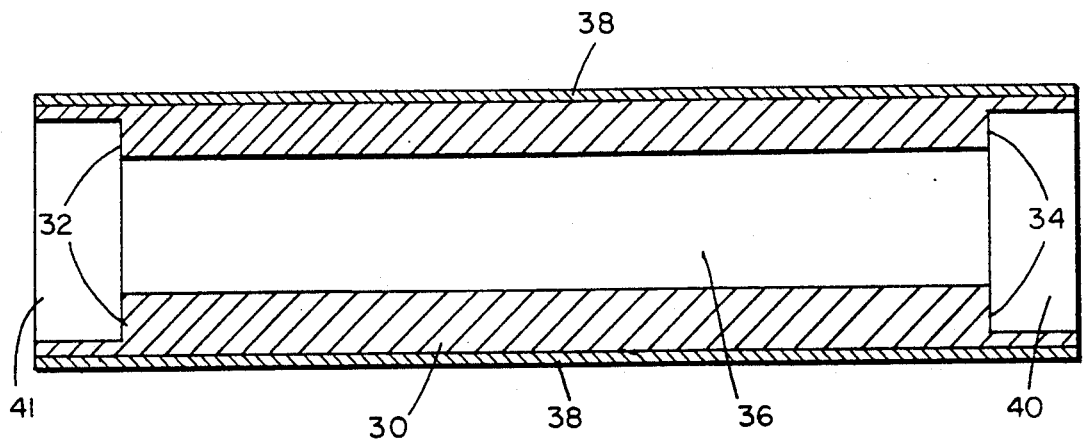
FIG. 4 depicts the adapter of the optical coupler.

FIG. 4 illustrates the adapter to which two connectors, such as 10a and 10b of FIG. 1, may be connected. The adapter 30 is the standard SMA 906 in-line adapter. The adapter 30 has threads 38 that complement the optical connector nuts 14a and 14b (FIG. 1). The connector 10, is, thus, screwed to the adapter 30 to secure it firmly in place. The adapter 30 includes openings 42 and 40 for receiving the two separate connectors. Each of these openings has shoulders 34 and 32, respectively, that abut the flanges 26 of the connectors 10a and 10b to precisely position the connectors 10 relative to the adapter 30. FIG. 1 makes especially clear how the flanges 26a and 26b abut shoulders 36 and 34, respectively when the connectors 10a and 10b are positioned in the adapter 30. The gap realized between the optical fibers 44 and 46 is the product of appropriately epoxying the quartz ferrules 18a and 18b within the respective connectors 10a and 10b. O-rings may be situated in the grooves 28 to create roughly hermetic seals between the connectors 10 and the adapter 30.

Figure 5:
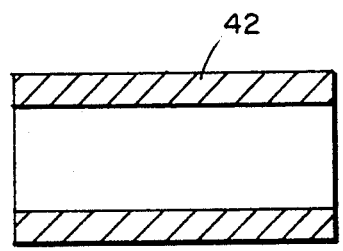
FIG. 5 is an illustration of a sleeve that is positioned within the adapter.

FIG. 5 shows a positioning sleeve 42 that is employed inside the main opening 36 of the adapter 30 (as shown in FIG. 1). The positioning sleeve is the SMA 906 alignment sleeve known in the prior art. The positioning sleeve 42 is preferably comprised of a somewhat slippery material such as a machinable plastic. The material used in the positioning sleeve 42 should flow slightly to insure a tight fit for the ferrules 18 positioned within the sleeve. An ideal candidate for the positioning sleeve 42 material is "DELRIN" produced by the E. I. Dupont de Nemours Corporation. The positioning sleeve 42 serves to properly position and hold the respective ferrules 18a and 18b of the optical connectors.

Figure 6:
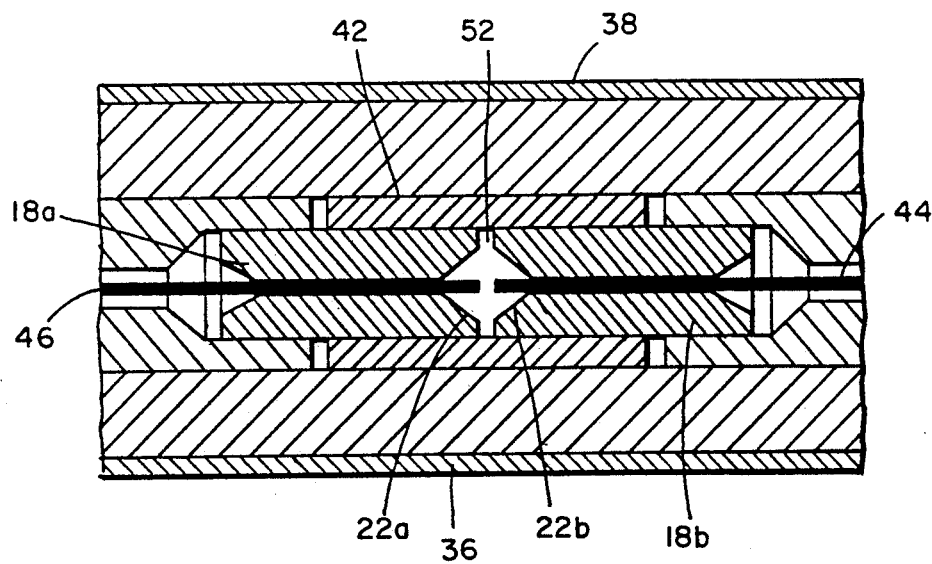
FIG. 6 is an enlarged longitudinal sectional view of the central region of the optic coupler illustrating the fiber interface.

FIG. 6 illustrates an enlarged view of the interface between the optical fiber 44 and 46. This figure points out the gap 52 that exists between the fibers 44 and 46. This gap 52 should be at least 0.001 inches. Optimally, the gap 52 should be at least 0.003 inches wide to allow for large manufacturing tolerance.

As mentioned above, the gap 52 provides added space for debris, including that caused by optical spillage, to travel so that it does not interfere with the optical connection. Given this role of the gap 52, it is apparent that one should seek to maximize the size of the gap 52. Unfortunately, if the gap 52 becomes too large, coupling efficiency (i.e. the percentage of signal that reaches the output fiber) suffers. As such, a reasonable gap must be chosen. For adequate spacing with reasonable coupling efficiency, the gap used with tapered fibers should not exceed 0.005 inches, and the gap for straight fibers should not exceed 0.010 inches.

Figure 7:
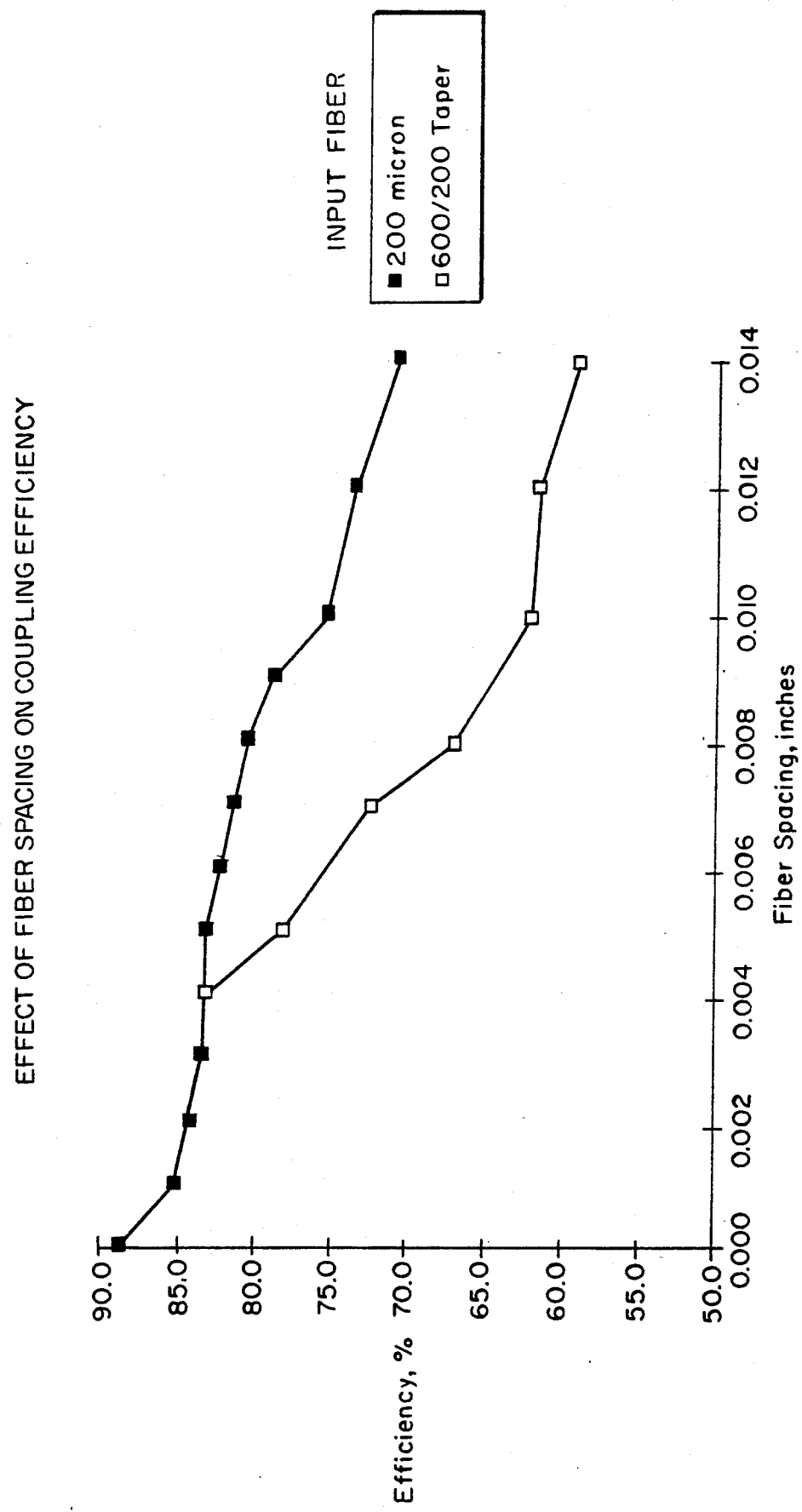
FIG. 7 is a plot of fiber spacing versus coupling efficiency.

FIG. 7 plots the coupling efficiency versus the fiber spacing in inches. As is evident by FIG. 6, the coupling efficiency remains relatively high for both a 200 micron fiber and a 600/200 micron tapered fiber until 0.004 inches. For that spacing, the coupling efficiency of the tapered fiber significantly diminishes, whereas the coupling of the non-tapered fiber diminishes but not as significantly. These results suggest that, with a 0.004 inch spacing between fibers, reasonable coupling efficiency can be expected without significant damage to the fibers.

The bevels 22a and 22b also provide supplemental space for debris to travel. The optical pressure exerted by the optical signals tends to push debris particles out toward the area created by the bevels 22a and 22b. The bevels 22a and 22b also help to minimize the generation of debris by removing the portion of the ferrule most likely to be struck by high intensity light with any spillage of the optical signal. Moreover, given the material of which the ferrules are made (i.e. fused quartz), there is less likelihood of debris being generated than in prior art systems. The optical fibers 44 and 46 are shown in FIGS. 1 and 5 as being flush with the ends of ferrules 18a and 18b, respectively. The fibers 44 and 46, however, need not be positioned in that manner. Equally viable alternatives are for the fibers to be recessed or to protrude slightly relative to the ends of the ferrules 18a and 18b. Still further, with recessed fibers, the ferrules 18a and 18b may be positioned in the adapter 30 so that they touch. In such an embodiment, the space for the debris to travel is solely created by the bevels 18a and 18b.

While the invention has been particularly shown and described with reference to preferred embodiments thereof, it will be understood by those skilled in the art that various changes in form and details may be made without departing from the spirit and scope of the invention as defined in appended claims.

We claim:

1. An optical coupler for optically coupling optical fibers, comprising:
   a) an adapter;
   b) a first optical connector for connecting a first optical fiber to the adapter, said first optical connector including a ferrule for positioning and aligning the first optical connector wherein said ferrule includes a bevelled end, the first ferrule being made of a material with an optical energy damage threshold at least at high as that of the first optical fiber; and
   c) a second optical connector for connecting a second optical fiber to the adapter such that the second optical fiber is positioned to create optical couping between the first optical fiber and the second optical fiber, wherein the second optical connector also includes a second ferrule with a bevelled end that faces the bevelled end of the ferrule of the first optical connector to create space about an interface between the optical fibers, the interface between the fibers comprising a gap between the fiber ends in the range of 0.001 to 0.005 inches, the second ferrule being made of a material with an optical energy damage threshold at least as high as that of the second optical fiber;
   wherein the material of each ferrule is capable of resisting damage when optical energies are passed through the fibers in excess of 20 Megawatts per square centimeter.

2. An optical coupler as recited in claim 1, further comprising a positioning means for properly positioning the ferrules of the optical connectors inside the adaptor, the positioning means partially surrounding each of the ferrules.

3. An optical coupler as recited in claim 2 wherein the positioning means comprises a sleeve of plastic material.

4. An optical coupler as recited in claim 1 wherein the adapter is threaded and the optical connectors each further comprise nuts that secure the optical connectors to the adapter by being screwed onto threaded portions of the adapter.

5. An optical coupler as recited in claim 1 wherein the first and second optical fibers are separated by a gap of about 0.003 inch to 0.005 inch.

6. An optical coupler for optically coupling optical fibers, comprising:
   a) an adapter;
   b) a first optical connector for connecting a first optical fiber to the adapter, said first optical connector including a ferrule for positioning and aligning the first optical connector wherein said ferrule includes a bevelled end, the first ferrule being made of a material with an optical energy damage threshold at least at high as that of the first optical fiber; and
   c) a second optical connector for connecting a second optical fiber to the adapter such that the second optical fiber is positioned to create optical couping between the first optical fiber and the second optical fiber, wherein the second optical connector also includes a second ferrule with a bevelled end that faces the bevelled end of the ferrule of the first optical connector to create space about an interface between the optical fibers ,the interface between the fibers comprising a gap between the fiber ends in the range of 0.001 to 0.005 inches, the second ferrule being made of a material with an optical energy damage threshold at least as high as that of the second optical fiber
   wherein intensity of light signals that pass between the optical fibers exceeds 20 megawatts per square centimeter.

7. An optical coupler for coupling optical fibers, comprising:
   a) a first optical fiber capable of carrying light signals having an intensity greater than 20 Megawatts per square centimeter, the fiber being housed in a first ferrule of a material with an optical energy damage threshold at least as high as that of the first optical fiber, the ferrule being bevelled to provide space about a coupling end of the first optical fiber;
   b) a second optical fiber capable of carrying light signals having an intensity greater than 20 Megawatts per square centimeter, the fiber being housed in a second ferrule of a material with an optical energy damage threshold at least as high as that of the second fiber, the ferrule being bevelled to provide space about a coupling end of the second optical fiber and positioned so that the coupling end of the second optical fiber is optically coupled with the coupling end of the first optical fiber and a gap greater than 0.001 inch exists between the optical fibers; and
   c) a positioning means for holding the first optical fiber and the second optical fiber in proper position, the positioning means partially surrounding each of the ferrules.

8. An optical fiber as recited in claim 7 wherein the gap between the first optical fiber and the second optical fiber is at most 0.005 inch.

9. An optical coupler as recited in claim 7 wherein the gap between the first optical fiber and the second optical fiber is approximately 0.004 inch.

10. An optical coupler as recited in claim 7 wherein the ferrules comprise fused quartz.

11. A method of minimizing damage at an optical interface between optical fibers capable of transporting optical signals having intensities which exceed 20 Megawatts per square centimeter, the method comprising the steps of:
 a) positioning each of the optical fibers in ferrules each made of a material having an optical damage threshold at least as high as that of the optical fibers, each ferrule having a bevel that faces the interface; and
 b) positioning the optical fibers so that they have a gap between them of at least 0.001 inch.

12. A method as recited in claim 11 wherein the fibers are positioned to have a gap greater than 0.003 inch.

13. A method as recited in claim 11 wherein the second fiber is a tapered fiber and the gap between fibers is at most 0.005 inch.

14. A method as recited in claim 11 wherein the optical fibers are non-tapered and the gap between fibers is at most 0.010 inch.

* * * * *